Figure 5:
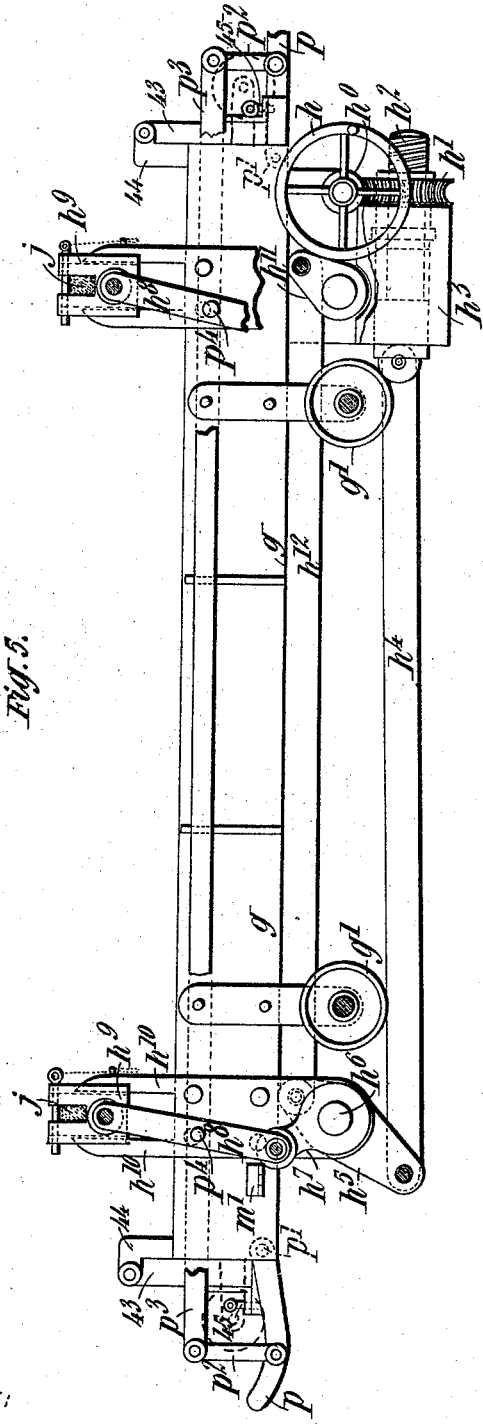

(No Model.) 4 Sheets—Sheet 1.
J. ADAIR.
MACHINE FOR ROLLING AND MOLDING DOUGH.
No. 535,269. Patented Mar. 5, 1895.
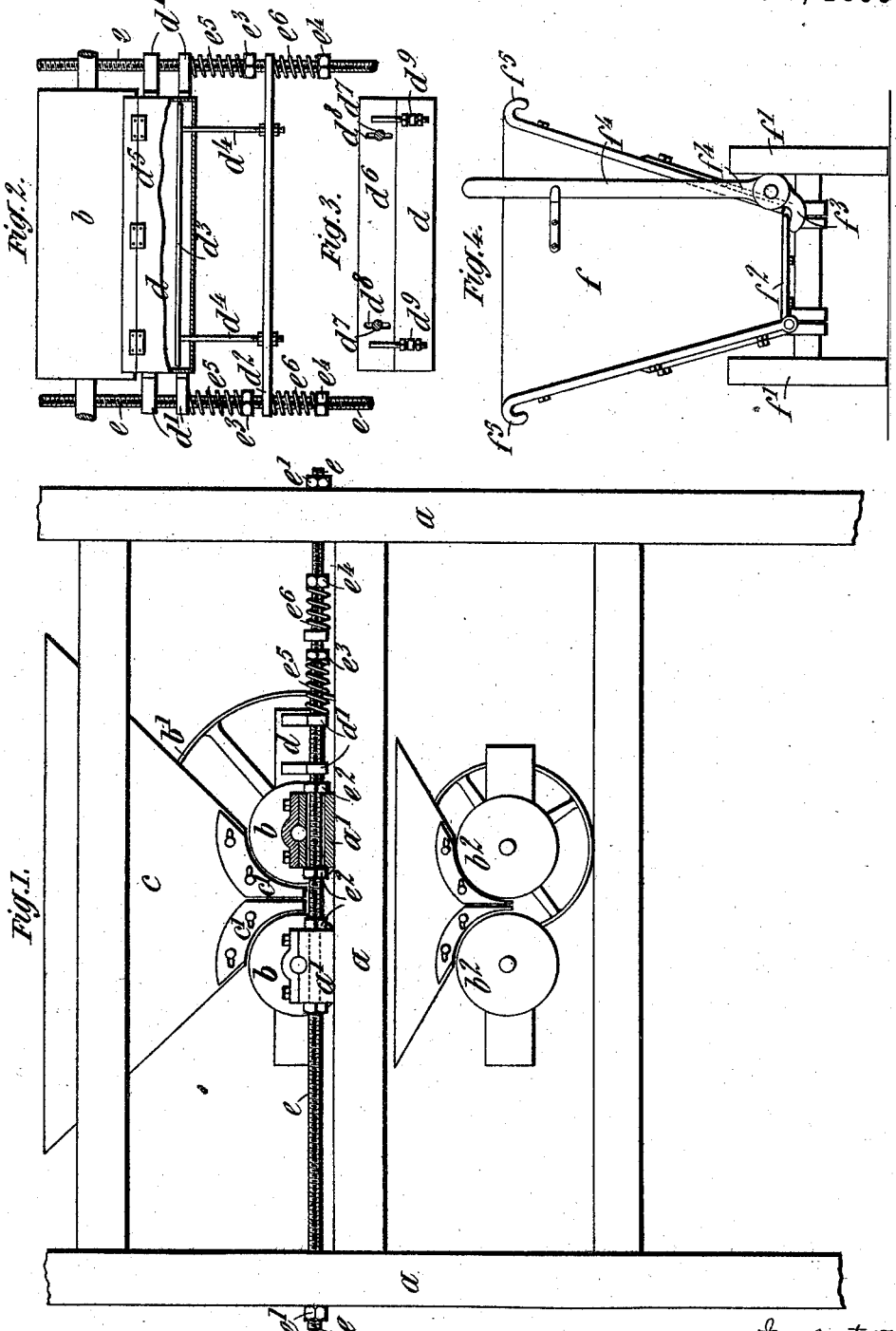
Witnesses:
G. W. Rea.
Thos. A. Green
Inventor:
John Adair,
By James L. Norris.
Atty.

(No Model.) 4 Sheets—Sheet 2.

J. ADAIR.
MACHINE FOR ROLLING AND MOLDING DOUGH.

No. 535,269. Patented Mar. 5, 1895.

Witnesses:
G. W. Rea.
Thos. A. Green

Inventor:
John Adair,
By James L. Norris,
Atty.

(No Model.) 4 Sheets—Sheet 3.
J. ADAIR.
MACHINE FOR ROLLING AND MOLDING DOUGH.
No. 535,269. Patented Mar. 5, 1895.
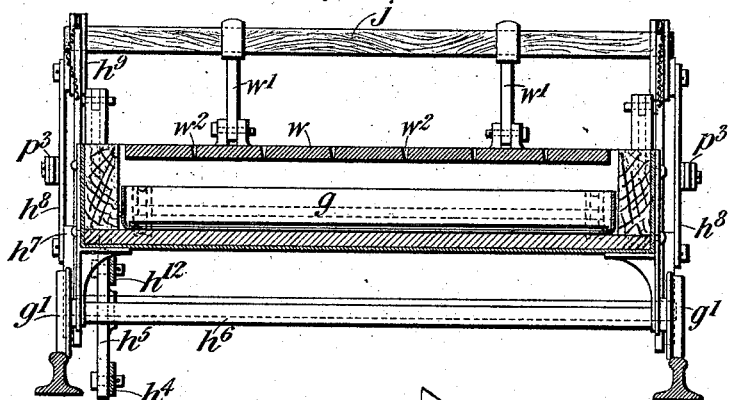
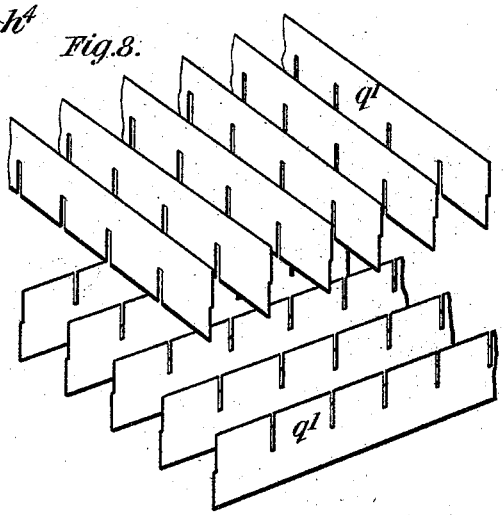
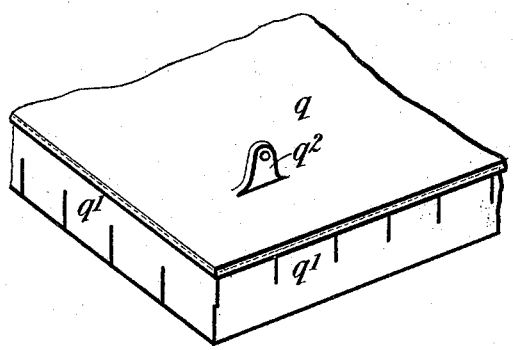
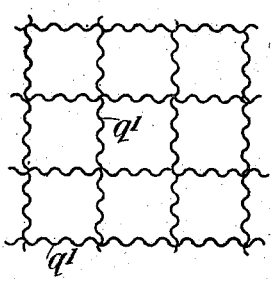
Witnesses:
G. W. Rea.
Dennie Sumby.
Inventor:
John Adair,
By James L. Norris.
Atty.

(No Model.) 4 Sheets—Sheet 4.
J. ADAIR.
MACHINE FOR ROLLING AND MOLDING DOUGH.

No. 535,269. Patented Mar. 5, 1895.

Witnesses:
G. W. Rea.
Thos. A. Green

Inventor:
John Adair,
By James L. Norris.
Atty.

UNITED STATES PATENT OFFICE.

JOHN ADAIR, OF WATERFORD, IRELAND, ASSIGNOR TO THE ADAIR SYNDICATE, LIMITED, OF LONDON, ENGLAND.

MACHINE FOR ROLLING AND MOLDING DOUGH.

SPECIFICATION forming part of Letters Patent No. 535,269, dated March 5, 1895.

Application filed March 3, 1894. Serial No. 502,268. (No model.) Patented in England July 17, 1890, No. 11,139, and March 29, 1892, No. 6,024.

*To all whom it may concern:*

Be it known that I, JOHN ADAIR, commission agent, a subject of the Queen of Great Britain, residing at Waterford, in the county of Waterford, Ireland, have invented certain new and useful Improvements in Machines for Rolling and Molding Dough, (for which I have obtained patents in Great Britain, No. 11,139, dated July 17, 1890, and No. 6,024, dated March 29, 1892,) of which the following is a specification, reference being had to the accompanying drawings.

This invention relates to improvements in dough rolling and molding machines, and it consists in the novel features of construction, and the arrangement and combination of parts hereinafter fully described and claimed.

According to this invention the dough after it is sufficiently fermented is placed in a hopper or receptacle the bottom of which is closed by rollers. When the rollers are rotated the dough is withdrawn from the hopper or receptacle and delivered into another receptacle which may be called a "roller-box." The dough in its passage between the rollers is rendered more homogeneous and a large portion of the gas contained therein is expelled therefrom. It is sometimes convenient to pass the dough through more than one set of rollers and in that case the second set is placed immediately under the first set so that the dough will fall directly on to the second set without requiring to be handled. From the "roller-box" the dough is discharged evenly into what is herein called the pressing box and is received on the baking tray which has been previously passed into the pressing box. A strong frame or plate is placed on the dough and pressed down evenly on the top thereof so as to make the whole mass of uniform thickness. This plate must be left some time on the dough so that the corners of the box may be filled up and the dough as far as possible evenly spread. The pressing frame or plate is now removed and the molding into loaves or cakes is then effected by a simple dividing apparatus.

Figure 7:
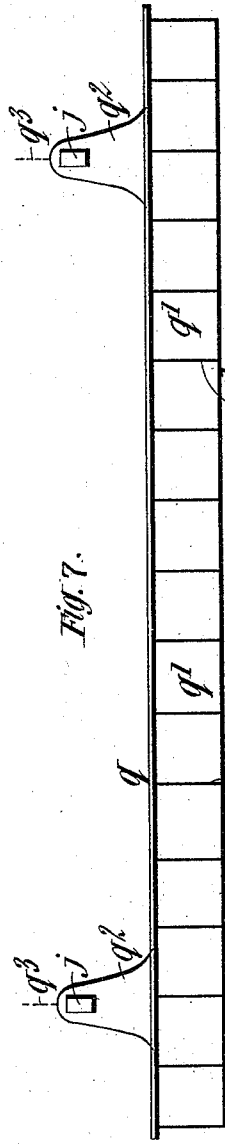
Figure 11:
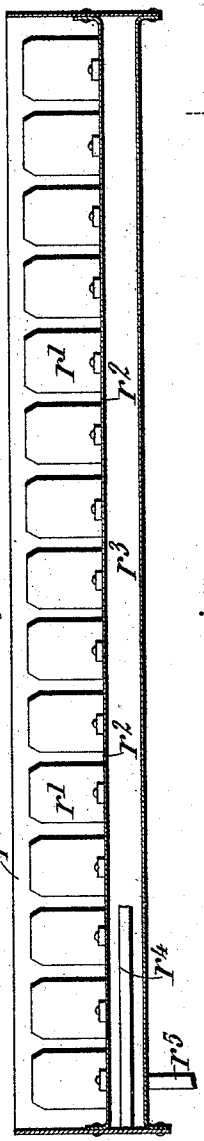
Figure 12:
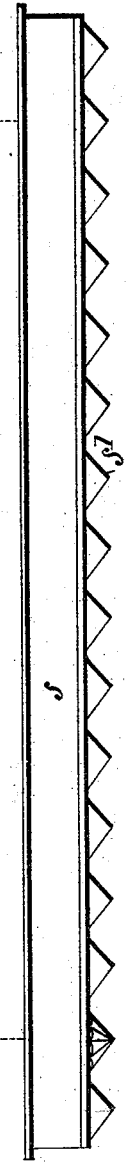
Figure 13:
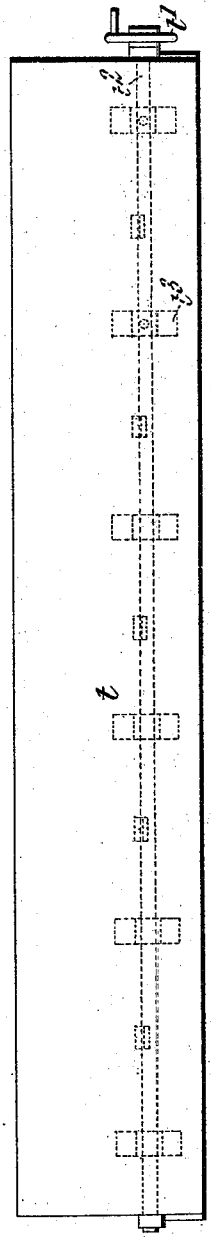

In the accompanying drawings, Figure 1 is an elevation showing the hopper and rollers used for pressing the dough and rendering the same more homogeneous according to this invention. Fig. 2 is a plan of one of the rollers and its attachments. Fig. 3 is a detail view of part of Fig. 2. Fig. 4 is an end view of the "roller-box." Fig. 5 is an elevation of a pressing-box constructed according to my invention. Fig. 6 is a transverse section of said pressing-box. Fig. 7 is a side elevation of a frame cutter hereinafter described. Fig. 8 is a perspective view of the blades of said cutter detached, to illustrate the construction more clearly. Fig. 9 is a perspective view of one corner of the frame cutter. Fig. 10 is a plan view of a portion of the frame cutter provided with fluted or corrugated cutting blades. Fig. 11 is a longitudinal section of a lard or oil tray. Fig. 12 is a view of a frame molder, and Fig. 13 is a view of a rice-box of which the said frame molder constitutes the lid.

Similar letters and numerals of reference denote corresponding parts in all the drawings.

Referring now to Figs. 1 to 3, $a$ is the frame work of the machine.

$a'$ $a'$ are bearings which carry the rollers $b$, $b$. One or both of said bearings is or are adjustable as hereinafter described.

$c$ is the hopper supported by the framework and furnished with adjustable plates $c'$ which can be moved to or from each other to suit the rolls as the latter are adjusted.

$d$ is a box open at one side to the adjacent roller $b$ so that the contents of said box are in contact with the roller. The said box is intended to contain rice flour. As the roller turns it is dusted with the flour and the dough is thus prevented from sticking thereto.

$e$ is a screw secured to the frame $a$ by nuts $e'$. The box $d$ is furnished with brackets $d'$ that can slide on the screws $e$ which thus serves as supports for the box. On the said screw are provided other nuts $e^2$, $e^3$ and $e^4$. The nuts $e^2$ engage one on each side of the roller bearings $a'$ and by adjusting the position of the said nuts on the screw the said bearings $a'$ and rollers $b$ may be brought closer together or removed farther apart as required. The nut $e^3$ on each side the apparatus forms an abutment for one end of a spring $e^5$ the other end of which presses against one of the brackets $d'$. The said nut $e^3$ when screwed up compresses the spring $e^5$ and thereby keeps the box $d$ pressed against the roller.

Within the box $d$ is a slide $d^3$ connected by rearwardly projecting rods $d^4$ with a bar $d^2$ that is controlled through springs $e^6$ and nuts $e^4$ on the screws $e$ and can be pushed farther into the box or drawn back as required. The said slide $d^3$ is for the purpose of pushing the flour or the like in the box $d$ against the roller. The box is provided with a lid $d^5$ through which access is gained to the interior for the purpose of cleaning the same or replenishing the box with flour. The bottom of the box is furnished with a thin plate $d^6$ shown in Fig. 3 which plate is attached to the box, by screws $d^7$ passed through slots $d^8$ in the plate. Adjusting screws $d^9$ are also provided to allow of setting the plate quite close against the roller. Said plate is for the purpose of scraping or cleaning the roller.

The rollers are driven by the pulley $b'$. In some cases a second pair of rollers $b^2$ are provided underneath the first pair to permit of treating the dough twice before passing it into the "roller-box" without the necessity for lifting it a second time. The said second pair of rollers are revolved at a faster speed than the first pair and are closer together. All the rollers are provided with the attachments and boxes above described.

Fig. 4 shows a box $f$ which receives the dough as it issues from the rollers. The said box $f$ is carried on wheels $f'$ and is provided with a hinged bottom $f^2$, which is supported by a catch $f^3$ controlled by a lever $f^4$. When it is desired to discharge the dough from the box, the catch $f^3$ is released, whereupon the bottom opens and allows the dough to fall out. The box rests loosely on the wheel axles and may be lifted therefrom by means of the handles $f^5$. By opening the box when not resting on the axles, any grit or dust there may be on the wheels is prevented from falling into the dough.

Referring now to the pressing-box shown in Figs. 5 and 6, $g$ is a flat box of suitable dimensions strongly made of wood or other material, and adapted to receive the dough to be made into loaves after the same has undergone the rolling treatment above described. It is mounted on wheels $g'$ for convenience of transportation.

$h$ is a hand-wheel by which through the worm $h^0$ and worm-wheel $h'$ which also forms a nut, a screw shaft $h^2$ can be slid longitudinally through its bearing $h^3$. Said screw shaft is connected by a rod $h^4$ to a crank $h^5$ fixed on a shaft $h^6$ near one end of the pressing box, which shaft is supported in suitable bearings. Said shaft $h^6$ is connected by a crank $h^7$ and connecting rod $h^8$ with a block $h^9$ capable of sliding up and down between stationary guides $h^{10}$. Near the other end of the box is another precisely similar arrangement of sliding block operated by a crank and connecting rod from its corresponding shaft which is connected by a link $h^{12}$ and cranks $h^{11}$, with the shaft $h^6$.

It will be readily understood that when the hand-wheel $h$ is rotated, the blocks $h^9$, $h^9$ will be raised or lowered with considerable force. The sides of the box are suitably strengthened to prevent bulging, a convenient method of strengthening being by clips passing underneath the box.

The dough having been placed in the box $g$ is first pressed flat and made of uniform depth all over the box by means of a presser plate $w$, Fig. 6, which fits the box and can be connected by links $w'$, to bars $j, j$ adapted to fit in the blocks $h^9 h^9$ so that when said blocks are depressed as above described the plate is thereby forced down on the dough with considerable pressure. The dough being soft and yielding flows under the pressure until the layer underneath the plate is even and of the same thickness throughout. By the gradual pressure a smooth skin is formed on the dough which is very advantageous. In order to let the air out from under the pressing plate when pressing, conical holes $w^2$, are provided in the said plate the smaller ends of the holes being underneath next to the dough. To prevent the dough from sticking to the presser plate, the under surface of the same may be larded or greased and dusted with flour. This greasing and dusting of the presser plate also insures a clear firm skin being formed on the dough; or greased perforated paper may be placed over the dough before pressing, to prevent the latter from sticking to the presser board. If the dough is very lumpy the greased paper may be attached by clips or otherwise to the presser plate. When this operation is completed, the pressing plate is removed.

The dough is, as before stated, passed directly from the roller box to the baking tray which tray has been previously placed in the pressing-box $g$. The said box is made with movable ends 43, 43 pivoted to brackets 44, 44 which ends can be raised to allow of the tray being passed into the box and then lowered and secured by pins 45, 45 or otherwise. The tray is preferably furnished with wheels on which it can roll; and in order that it may be conveniently lowered when in the pressing box so as to bed firmly on the bottom of said box and thus take the pressure from off the wheels during the pressing operation, I provide rails $p, p$ hinged to the pressing box at $p', p'$ at the forward and rear ends thereof and connected by links $p^2, p^2$ to side rods $p^3$ which are bolted at $p^4, p^4$ or otherwise secured to the connecting rods $h^8$ so as to be operated thereby and raised and lowered simultaneously with the pressing board. By lowering the said rails the tray is allowed to rest firmly on the bottom of the pressing box. The rails $p$, at one end of the box are curved as shown to prevent overrunning when the tray is introduced. The treatment of the dough while in the box $g$ is therefore as follows, that is to say, the dough is received on the tray, which is then run into the box $g$ and allowed to rest on the bottom of the said box. Then the pressing tray is brought down on the dough and forcibly pressed thereon to produce a flat uniform surface. Then the cutting frame and the molding frame hereinafter described are used to separate the dough into loaves and to mold the surface thereof.

The cutting frame $q$, Figs. 7 to 9, is formed with a back to which are attached the cutters $q'$ consisting of strips of sheet steel which may be enameled, arranged to form squares or other desired shapes. Each strip is slit half way across at the intersection with another strip so as to allow of fitting together and interlocking in a well-known manner. The said slits are preferably made alternately at opposite sides. Lugs $q^2 q^2$ are provided on the back of the frame through which the bars $j, j$ pass that serve to connect the frame to the pressing apparatus. Lifting chains $q^3 q^3$ are also attached to the lugs $q^2 q^2$. When not in use for separating the dough, the frame cutter is allowed to rest in a lard or oil trough or tray $r$, Fig. 11, which is preferably furnished with wooden or thin sheet metal blocks $r'$ that pass up into the spaces between the blades of the cutter so as to diminish the quantity of lard or oil required to fill the trough or tray. The corners of the said blocks are beveled or rounded to facilitate the guiding of the cutter when the same is being placed in the tray. The said tray is provided with a false bottom $r^2$ forming a chamber $r^3$ into which steam is introduced through a pipe $r^4$ for heating the tray to keep the lard melted. $r^5$ is the outlet pipe for the waste steam. A cover is provided for the oil tray to keep out dust. The blades of the cutting frame may be fluted, as shown in Fig. 10, so as to retain more oil where such is desirable. Before using the frame cutter, the oiled papers are removed from the surface of the dough. It is important that the cutters should not be sharp, otherwise they would cut through the skin of the dough instead of merely pressing it down between each pair of loaves as is the case when the cutters are blunt. The cutter after having been pressed gradually until it rests on the tray is allowed to stand as long as desired, and is then slowly lifted until it has freed itself from the dough, during which process the oil or lard trickles down between the separated loaves and prevents the dough joining up again into one solid mass. No rice flour is thus needed to prevent re-joining of the dough. It will be obvious that by the above means I can insure that the loaves shall all be of approximately the same size. After the loaves have been formed they are molded at the top to the desired pattern by a frame molder $s$ Fig. 12 which is furnished at proper intervals with molding faces $s'$ and which can be lowered to press upon all the loaves simultaneously. This molding frame when not in use forms the lid of a flour box $t$ Fig. 13, and is dusted with fine rice flour by turning a wheel $t'$ secured on the end of a shaft $t^2$ to which are fixed a number of vanes $t^3$. These vanes stir up the flour when the wheel $t'$ is rotated and thus serve to dust the molding faces $s'$.

What I claim is—

1. The combination with rollers for rolling dough, of boxes for dusting the same with flour, each box having an open side presented to the corresponding roller, a spring controlled pressing board for pressing the flour against the roller, and an adjustable scraping plate for cleaning the roller, substantially as described.

2. The combination of the dough-box $g$, the presser plate, the pressing bars $j$ carried by blocks $h^9$ which are movable in guides $h^{10}$, means for raising and lowering said blocks, and the hinged or pivoted rails $p$ connected to and operated by the means which control the blocks $h^9$, substantially as described and for the purpose specified.

3. The lard or oil tray constructed with a false bottom $r^2$ forming a chamber into which heating fluid can be introduced and having a number of raised blocks $r'$, substantially as described and for the purpose specified.

In witness whereof I have hereunto set my hand this 25th day of January, 1894.

JOHN ADAIR.

Witnesses:
MICHL. I. HASTY,
17 *William Street, Waterford, Ireland, Solicitor's Apprentice.*
JOHN BOYD,
44 *Manor Street, Waterford, Ireland, Solicitor's Clerk.*